Figure 1:
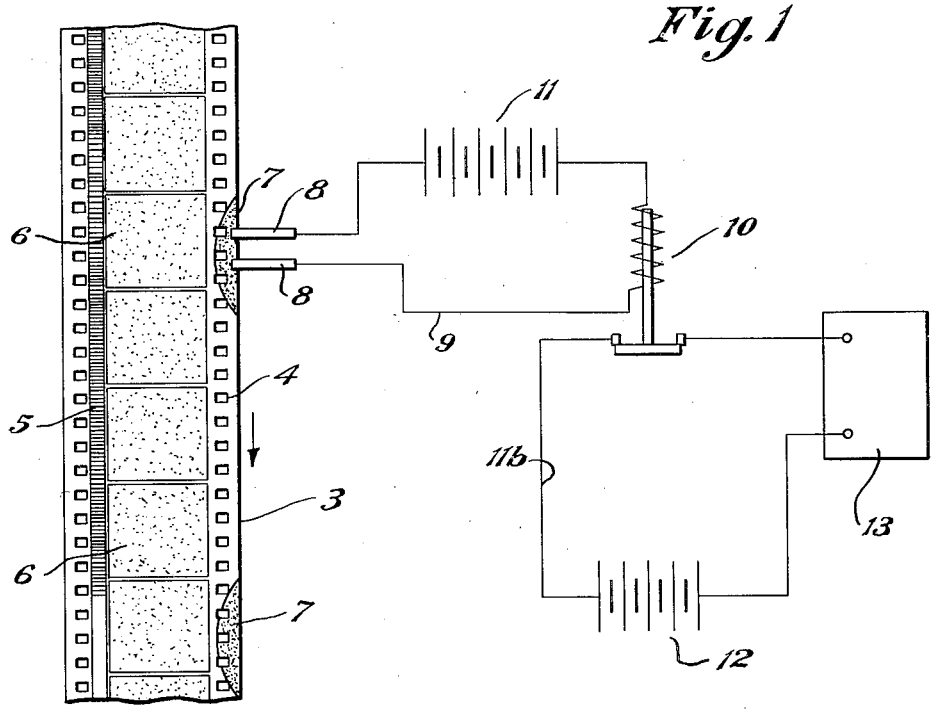

March 13, 1934.  E. A. READ  1,950,518
CURRENT CONDUCTING FILM CUE MARK
Filed July 21, 1932

Inventor
Earl A. Read
By Fraser and Bishop
Attorneys

Patented Mar. 13, 1934

1,950,518

UNITED STATES PATENT OFFICE 1,950,518

CURRENT CONDUCTING FILM CUE MARK

Earl A. Read, Canton, Ohio

Application July 21, 1932, Serial No. 623,836

4 Claims. (Cl. 200—52)

The invention relates to the marking of a motion picture film with cues of electric current conducting material, related to pre-selected film scenes and/or sound records on the film, for controlling an electric circuit to produce electrical impulses, synchronized with the film, for operating bells, buzzers, light signals, lights, curtains or stage effects, horns, volume controls, color devices, projector starting and stopping devices, projector change-over devices, rewind controls, film printing devices, and the like.

It has been proposed to operate electrical devices from cue contacts on a film, by providing metal strip or foil contacts on the film, which pass over a plurality of contacts in an electric circuit, to close the electric circuit and thereby operate electrical devices located in the circuit.

However, such metallic foil contacts on a film, although they may operate satisfactorily for a very short time, are not practical because they must be extremely thin in order not to diminish the flexibility of the film, and in order not to affect proper operation of film printing or projecting devices and the like, through which the film is passed and in which small clearances for the film must be positively maintained.

Such foil contacts, however, due to the constant bending and flexing of the film, first one way and then the other, as the film is run through fire valves, over sprockets, under tension shoes and around reels in projecting or printing devices are soon broken, either partially or entirely through, so as to destroy the conductitvity of the foil contacts or set up a resistance therein, which causes sparks or flashes as the foil contacts pass over the circuit contacts.

Thus, a fire hazard is present, because such sparks or flashes are in immediate proximity to the film, and the first passage of current through the broken foil contact will set fire to the film, which, except in certain cases, is a highly inflammable material.

Moreover, regardless of the possibility of breaking the foil due to flexing the same, metallic foils thin enough to be satisfactorily applied to a film soon wear through, due to the constant wear to which a film is subjected in being passed through a projecting or printing machine and the like, again producing a serious fire hazard.

Because of the fire hazard associated with the use of metallic contacts on films, film cue markings at present utilized in the motion picture industry for the operation of electrical devices synchronized with the film, are provided by notching or recessing the marginal edge of a film, so that as the film passes through a projecting or printing mechanism and the like, a shoe riding the edge of the film drops into the notch, thereby completing an electric circuit by a contact carried by the shoe, the electric circuit being one in which the electrical device or devices to be operated are also located.

Although the use of such notching methods are normally practically in a film printing machine, yet many difficulties occur in the use of the same in a film projector where the film is under considerable stress and strain at all times, is subjected to severe wear, and must be passed through the projector with extreme accuracy.

The provision of a notch on a film weakens the film at the location of the notch, with the result that the weakened place is the probable first place for the film to break or tear. Moreover, a notch or recess in a film, may cause the film to shift as it passes through a projector, so that the projected image on the screen shifts; and if the film is a sound film, the sound track is also shifted from its correct position.

Moreover, if the film becomes slightly mutilated, torn, cut or broken, the cuts, tears and breakage may operate the shoe riding the edge of the film in the same manner that a recess operates the shoe, so as to produce a false connection in the circuit controlled by the shoe neither intended nor desired.

It is therefore an object of the present invention to provide motion picture films with cue marks of electric current conducting material, for operating electrical devices in synchronism with the films, in a manner in which a fire hazard will not be produced.

It is a further object of the present invention to provide film cue marks which do not interfere with or mutilate the photographic pictures carried by a film or the sound track imposed thereon, and which enable the film to be passed with absolute precision through various standard projecting or printing machines, and the like, at the desired speed without impairing the operation of the said projecting and/or printing machines and the like.

It is a further object of the present invention to provide motion picture films with cue marks that do not weaken the film, so that a small tear or mutilation in the film will not cause false operation of the electric circuit, controlled or completed by the cue marks.

I have discovered that metallic or carbon dusts or powders may be mixed preferably with ether, banana oil and collodion and in such state may be applied as a paint to the film base, on the non-emulsion side of the film, or where emulsion is present on both sides of the film, on the film base after removal of the emulsion where the cue marks are desired to be placed. Moreover, the cue marks are preferably applied to the film base adjacent one edge of the film, preferably between adjacent film sprocket apertures and/or outside of the film sprocket apertures.

The ether dissolves or softens the film base sufficiently that the metallic or carbon powder becomes impregnated in the film base so as to unite with the film base and be fused into the film base upon drying. The powdered metallic or carbon paint is spread on the film base in a sufficient amount that there is contact between the infinite number of minute particles so as to form an electric conductor on the film.

Moreover, the metallic particles are impregnated individually in the film base so that the film retains all of its flexibility and the thickness thereof is not materially increased. Likewise, the minute particles of metallic or carbon material press against one another so that electric currents may be passed therethrough in minute amounts while the film still retains that flexibility required for passing it through film printing or projecting apparatus and the like, and so that the flexing does not injure the metallic or carbon cue marks, nor destroy the conductivity of the same.

Moreover, I have discovered that the metallic or carbon material cue marks impregnated in the film base are subjected to little if any wear in passing the film through a projector and the like. However, extreme care must be taken so that the passage of an electric current through the material impregnated directly in the film base does not heat up the electric conducting material and/or the film base to the ignition point of the film.

I have discovered that very small currents of upwards of ten micro-amperes may be passed through cue marks impregnated in the films without producing any perceptive heating effect upon the film so that the passage of current is accomplished with absolute safety.

However, a current of upwards of ten micro-amperes is not sufficient for operating usual electrical devices desired to be operated by the cue markings, but I have discovered that a current amplifier may be placed in the circuit completed by one of the improved cue marks so that amplified current in a secondary circuit also connected with the amplifier may be utilized for operating the desired electrical devices.

Although ordinary electric relays of the most sensitive type at present in use require a current of at least one-half milli-ampere for operating the same, yet I have discovered that a very sensitive relay can be made of piezo-electric material such as rochelle salt, which can be operated by a current of less than four micro-amperes. Accordingly, such a piezo-electric material relay can be connected in the circuit controlled by the improved cue marks for operating a second electric circuit in which the electrical devices are located which are desired to be operated in synchronism with the film.

It is therefore a further object of the present invention to provide motion picture films with cue marks by painting thereon powdered current conducting material, such as powdered carbon, metallic powders and the like, in suspension in a film soluble material, so that the current conducting material becomes impregnated in the film upon drying.

It is likewise a further object of the present invention to provide motion picture films with cue marks composed of powdered current conducting material suspended in a mixture of ether, and/or banana oil and/or collodion so as to impregnate the powdered current conducting material in the film upon drying.

It is a further object of the present invention to provide motion picture films with cue marks of flexible, wear resisting, electric current conducting material impregnated in the film.

It is likewise a further object of the present invention to provide motion picture films with cue marks of electric current conducting material which will instantaneously pass small currents of upwards of ten micro-amperes with absolute safety.

It is also a further object of the present invention to control electrical devices by film cue marks selectively in circuit with controlling devices, operable by small currents of upwards of ten micro-amperes.

It is a further object of the present invention to operate electrical devices by a piezo-electric material relay, operable by a current of upwards from ten micro-amperes, passed through current conducting material impregnated in the motion picture film.

And finally, it is an object of the present invention to accomplish the aforesaid desiderata in a convenient, simple and inexpensive manner.

These and other objects may be obtained by the inventions, improvements, combinations, elements, constructions, parts, methods and products comprising the present invention, preferred embodiments of which are hereinafter described in detail and illustrated diagrammatically in the drawing, which may be stated in general terms as including in combination with a motion picture film, an electric circuit adapted for having electric impulses passed therethrough, said circuit including a zone of current conducting material impregnated in the film, spaced contacts in the circuit in contact with said zone, a source of electric power in the circuit, and an electrical device operable by passage of current through the circuit.

Figure 2:
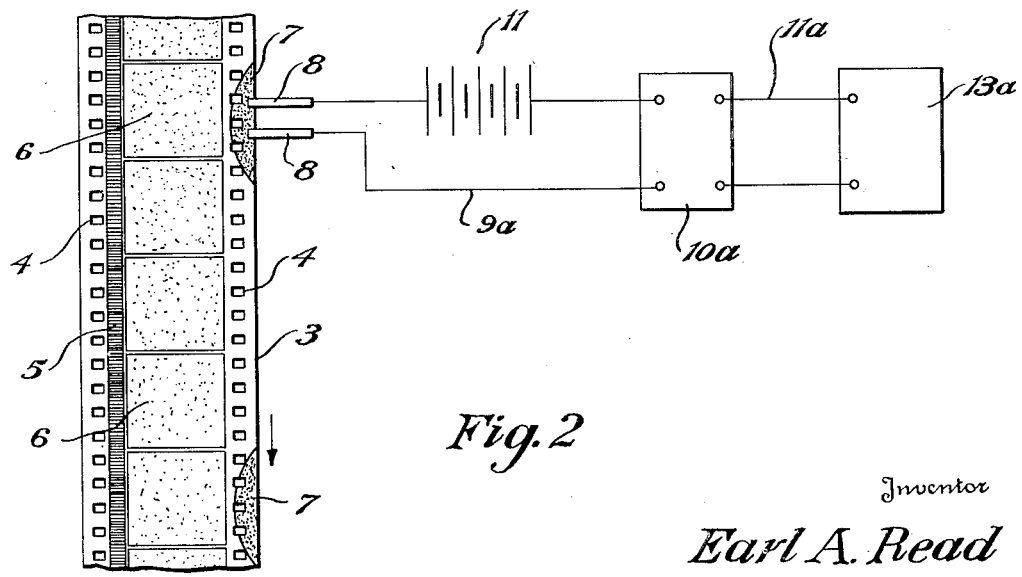

In the drawing,

Figure 1 is a diagrammatic view of a moving picture film provided with the improved cue marks, showing one of the cue marks in contact with spaced contacts of an electric circuit, which circuit includes a relay operating a secondary circuit; and Fig. 2 is a view similar to Fig. 1 showing a current amplifier in the circuit completed by the cue mark on the film.

Similar numerals refer to similar parts throughout the drawing.

Referring to Fig. 1, a portion of a motion picture film in indicated at 3, which film includes the usual apertures 4 for engagement with the usual driving sprockets and the like of a projector and the like; and the film also includes the usual sound track 5 and successive picture frames 6.

In carrying out the present invention, when it is desired to synchronize the operation of electrical devices with movement of the film, cue marks generally indicated at 7, are provided at the desired predetermined places, preferably on the non-emulsion surface of the film adjacent to a lateral edge portion thereof between the apertures 4 and the edge portion of the film and/or between successive apertures 4, as shown in Fig. 1. If there is emulsion present on both sides of the film, as is the case in certain types of color films, the emulsion must be removed from the film base before applying the cue marks 7.

The cue marks 7 are provided by mixing comminuted, wear-resisting current conducting material such as powdered metallic material or powdered carbon in a film base soluble material, which may preferably include ether, banana oil and collodion, to form a paint. The paint is then applied at the desired predetermined place on the film, whereupon the film soluble material softens the film base so that the comminuted current conducting material becomes impregnated therein and flexible with the film, after the paint and film have been dried.

Spaced electric contacts 8 are provided in a circuit 9, which includes a relay generally indicated at 10 and a source of electric power generally indicated at 11. The relay indicated at 10 is shown diagrammatically and preferably comprises a relay formed of piezo-electric material operable by the passage of an electric current impulse of upwards of ten micro-amperes through the circuit. The relay 10 controls a secondary electric circuit 116 having a source of power indicated diagrammatically at 12, connected with an electrical device indicated diagrammatically at 13, the operation of which is desired to be coordinated or synchronized with the film movement.

When the film 3 is passed through motion picture apparatus, the cue marks 7 successively pass over the spaced contacts 8 and complete the electric circuit comprising the wire 9, the relay 10, the source of power 11, the contacts 8 and the cue mark current conducting material 7. The relay 10 is a super-sensitive relay operable by the passage of a very small current of say four micro-amperes through the circuit.

Upon operation of the relay 10, the secondary circuit 16, controlled by the relay 10, including the source of power 12 and electrical device 13, is closed so that the electrical device 13 is operated when the predetermined cue marks 7 on the film 3 passes over the spaced contacts 8. When the relay 10 is a piezo-electric material relay, a shunt or leak, (not shown) is placed in the primary circuit 9 for discharging the piezo-electric material after operation of the relay.

The passage of current through the circuit and through the current conducting material cue marks 7 is so small that no perceptive change in temperature occurs in, at or adjacent to the film and no sparking or arcing occurs between the cue marks 7 and the contacts 8, so that no fire hazard is produced.

An alternative form of wiring the circuits controlled by the cue marks is shown in Fig. 2 wherein the primary circuit 9a has a current amplifier therein, indicated diagrammatically at 10a, so that electrical impulses in the circuit 9a resulting from the passage of very small amounts of current therethrough when a cue mark 7 completes the circuit between the contacts 8 causes the current amplifier 10a to send out electrical impulses in the secondary circuit 11a to operate an electrical device 13a connected therein.

Accordingly, an improved method of marking films with cue marks is provided by the present invention wherein current conducting material is impregnated in the film base to directly carry current with safety for completing an electric circuit in which an electrical device is located, the operation of which is desired to be synchronized or coordinated with film movement.

I claim:—

1. A motion picture film provided with a zone of comminuted current conducting material impregnated in the film.

2. A motion picture film provided with a zone of comminuted wear resisting current conducting material impregnated in the film and flexible with the film.

3. A motion picture film provided with a zone of comminuted metallic current conducting material impregnated in the film for passing an electric current of upwards of ten micro-amperes through the zone.

4. A motion picture film provided with a zone of comminuted carbon impregnated in the film for passing an electric current of upwards of ten micro-amperes through the zone.

EARL A. READ.